Nov. 19, 1963 R. L. DANGLER 3,110,920
WINDSHIELD WIPING MECHANISMS
Filed June 15, 1962
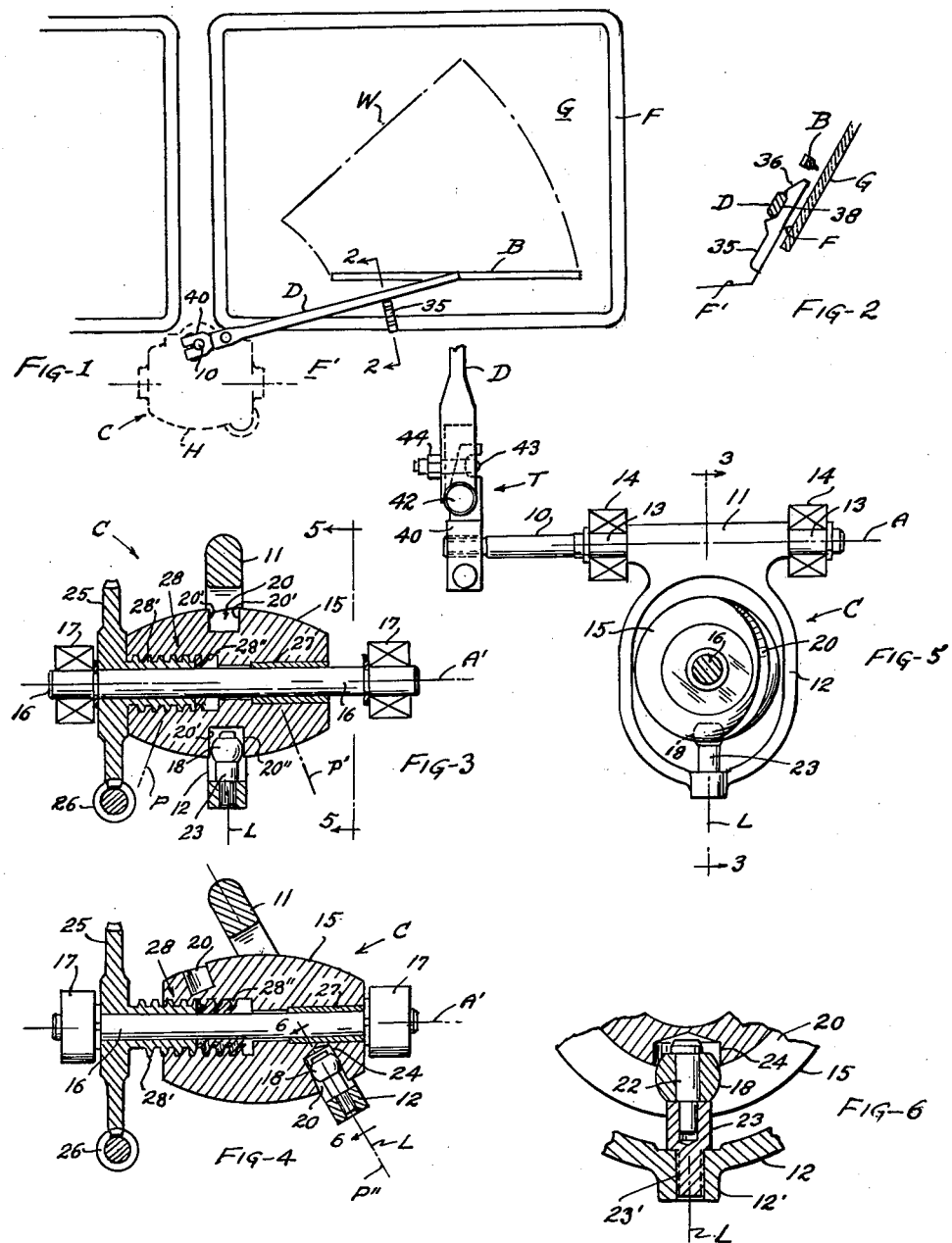
INVENTOR.
ROBERT L. DANGLER
BY
George M. Soule
ATTORNEY United States Patent Office 3,110,920
Patented Nov. 19, 1963

1

3,110,920
WINDSHIELD WIPING MECHANISMS
Robert L. Dangler, Shaker Heights, Ohio, assignor to Curtiss-Wright Corporation, a corporation of Delaware
Filed June 15, 1962, Ser. No. 202,845
7 Claims. (Cl. 15—250.16)

This invention relates to an electrically operated windshield wiping mechanism capable of being designed to impart efficiently to a heavy duty drive arm and wiper blade or squeegee assembly (as for high speed jet driven aircraft) extremely high wiping speed; capable of practical application and control automatically to park the wiper blade beyond its normal stroke in one direction as a function of stopping and reversing the driving motor and, additionally, in order to avoid maintenance of undesirable pressure forces against the wiper blade and to prevent abrasive dust from collecting adjacent the blade when the wiper is not working, being capable of operation to park the wiper blade in a suitable raised position off the windshield.

An object of the invention is to provide a simple, inexpensive, highly efficient and durable motion converter (rotary to oscillating motion) wherein harmonic or uniformly accelerated and decelerated reciprocating movement can be imparted to a wiper blade for example at high speed and high torque.

Objects and features of the invention not indicated above will be brought out and explained in the following description of an illustrative form hereof.

In the drawing, FIG. 1 is a fragmentary front view of a portion of an aircraft windshield and framework, showing diagrammatically a typical installation of the wiper and motion converter mechanism hereof for aircraft use.

FIG. 2 is a largely diagrammatic, sectional detail view, taken at 2—2 on FIG. 1, showing a blade-parking ramp portion of the present subject mechanism.

FIG. 3 is an assembly view (reversed in position relative to FIG. 1, left to right) showing the principal working parts of a converter mechanism hereof in central longitudinal section along the axis of a main supporting shaft and a cam drum coaxial therewith.

FIG. 4 is a view similar to FIG. 3 showing the cam drum and a cam follower assembly in a relative position to accomplish automatic parking of the wiper in a beyond-normal-stroke position.

FIG. 5 is a transverse sectional view of output portions of the converter mechanism assembly taken along the line 5—5 on FIG. 3.

FIG. 6 is a detail sectional view taken as indicated at 6—6 on FIG. 4.

In FIGS. 1, 2 and 5 windshield wiper drive arm D supports wiper blade or squeegee unit B, via suitable guiding linkage and saddle devices not shown, for normal wiping movement over an area such as partially outlined in broken lines at W of a windshield panel G in framework F. The drive arm D is scured to a drive shaft 10 of converter unit C in a suitable rigid housing H (FIG. 1 only) shown by dotted lines as though mounted within and concealed by a forward wall portion F' of the fuselage as is usual in electric wiper installations.

In FIG. 5 the converter output, drive shaft 10, is illustrated as comprising an integral part of a lever member

2

11 in the form of a yoke having an annular arm portion 12 and journal portions 13 on which, via suitable bearings 14 in the housing H, the lever or yoke member 11 can rock about a fixed axis A, FIG. 5, in the housing which as installed is approximately normal to the rearwardly inclined principal plane of the windshield panel G rather than being horizontal as in FIG. 5. The annular arm or yoke portion 12 of the output member 11 loosely surrounds a cam drum 15, preferably of barrel shape, which is rotated (by power means to be described) on a fixed (e.g.) horizontal axis A', FIG. 3, coincident with that of a supporting shaft 16 having suitable bearings 17 in the housing.

The annular arm portion of the yoke member 11 carries a cam follower 18, shown of generally spherical cam-surface-contacting form and located remotely of the yoke-supporting pivot axis A. The cam follower 18, during operation of the wiper over area W, FIG. 1, is in contact always with one or the other of two parallel cam faces 20' and 20" of a continuous peripheral cam groove 20 of the cam drum.

The barrel shape of the cam drum 15 enables the cam groove 20 to be basically of uniform depth, hence inexpensively finished; and the disposition of the cam follower 18, namely on the side of the cam drum lying farthest from the pivot axis A of the yoke member 11 (on which side the barrel shaped surface is concentric longitudinally of the cam drum with said pivot axis) enables operation at high mechanical advantage despite the compactness of the assembly. The cam groove 20, as already indicated, is designed to impart uniformly accelerated and decelerated motion to the wiper.

As shown in FIG. 6, the generally spherical cam follower 18 is supported for free rotation on a pin 22 rigidly carried in an axial bore of a mounting piece 23 (e.g. press fitted in the bore) which mounting piece, in turn, is tightly fitted into a hub-like portion 12' of the yoke member 12 as at complementary serrations 23'. To decrease unit pressure contact between the follower 18 and the cam groove surfaces, the follower preferably has a narrow equatorial cylindrical band surface not shown for engagement with the cam surfaces.

To drive the cam drum 15 a drive member such as worm gear 25, FIGS. 3 and 4, is connected with the drum as will be described and, as indicated the gear is turned by a worm 26 connected as by flexible shafting to the drive shaft of a suitable motor (not shown). The motor is preferably made to deliver torque at several forward speeds and to be reversible for blade-parking purposes as already mentioned.

In order to enable parking of the wiper blade unit B in a position beyond its normal stroke (e.g., below wiping area W as in FIG. 1) the cam drum 15 is slidable along its supporting shaft 16, and a steep pitch, freely operating, screw connection 28, FIGS. 3 and 5 (operable as in an engine starter of well known type), so that, during normal unidirectional or forward speed operation of the drive gear 25, the cam drum 15 is held by axial thrust of the screw connection 28 in contact with the hub of the worm gear (FIG. 3); and, when the motor is reversed, the cam drum 15 is automatically moved via axial thrust of the screw connection 28 oppositely of that previously mentioned to the position of the drum shown in FIG. 4, as into abutment with a fixed stop on the shaft (e.g.

against a washer or snap ring adjacent the rightward bearing 17). The screw connection 28 as illustrated comprises male screw threads 28' on a hollow hub portion of the drive gear 25 and freely mating threads 28" formed in the cam drum 15. The screw threads support one end of the cam drum on the shaft 16 and at the other end the cam drum has a supporting bushing 27 fixed in it around the shaft.

As illustrated by comparison of FIGS. 3 and 4 the parking position of lever or yoke member 11, along the rotational axis L FIG. 4 of the follower 18, is displaced counterclockwise out of the normal terminal stroke position of the follower (axis P' FIG. 3) as the wiper unit B approaches parking position (thus corresponding to the clockwise displacement when converter unit C is positioned as in FIG. 1). Incidentally both units C for pilot and co-pilot wiper installations are identical in construction but convertible for right and left hand use as is common in the art.

Motor operation in the forward driving direction can be discontinued exactly as the lever member 11 reaches the normal stroke limit position P', which may be accomplished as by a limit switch (not shown) operated at the proper time to close a dynamic braking circuit of the motor (not shown) as well known in the electrically operated windshield wiper art. Thereby the cam drum will be stopped in the angular position of it shown by comparison of FIGS. 4 and 6 and be retained in that position by load friction (e.g. wiper on windshield). If the motor is then conditioned for operation in reverse, the cam drum 15 will remain in the angular position just mentioned and will be shifted bodily along the shaft 16 to the parking position P" shown in FIG. 4 where it can safely and precisely be stopped as by suitable (e.g. magnetic braking) motor control augmented if necessary by a slip drive (not shown) between the motor and the worm gear mechanism. For example a second limit switch (not shown), operated by the cam drum or the lever member 11 or any part connected to either initiates braking of the motor when the cam drum has reached its rightwardly shifted position, FIG. 4. After deenergization of the motor circuit the non-rotating cam drum (locked by friction between the driving worm and gear teeth against being turned out of angular position) prevents the wiper drive arm D from moving out of parked position by reason of the cam follower 18 having entered a generally radial socket 24, FIGS. 4 and 6, in the cam drum and intersecting the cam groove 20.

Since the cam follower 18, in the position of it suitable for blade parking, as illustrated at the right in FIG. 4, will be moved closer to the cam drum axis A' than at any time during normal stroke operation of the wiper, and the rotational axis of the follower will then no longer be parallel to the associated side walls of the cam groove 20 but will be in the maximum inclined position L FIG. 4, a few degrees out of parallelism therewith as shown, the socket 24 is formed in the drum member 2 on an axis coinciding with the follower axis in its maximum inclined position L and of sufficient depth to receive the necessary portion of the follower 18 in that position thereof to lock the lever 11 against further movement. Since the motor attains zero speed before the parking operation can be commenced following arrest of the wiper unit B at the end of its normal down stroke, and the parking movement of the blade unit is relatively small, arrest and locking of the wiper unit precisely in the desired beyond-normal-stroke position is facilitated by the fact that the motor cannot, in the allowed time, have attained more than a rather low reverse speed when automatic shut-down operation is performed.

To commence normal wiper operation, after parking of the wiper the motor is simply re-started in its forward direction by suitable manual switch means not shown, whereby the cam drum 15 is moved back to its position illustrated in FIG. 3 by the screw connection 28 as will be evident.

In order to raise the wiper unit B off the windshield in the parked position, for reasons indicated in the introduction of this specification, the drive arm D (preferably a forging) rides over a cam device 35 in fixed relation to the windshield panel G, as on its frame F as illustrated in FIG. 2, having a ramp surface 36 at its leading edge and a drive-arm-retaining recess 38 beyond the ramp. The recess 38, preferably through flexure of the drive arm which can conveniently be made as a strong forging and essentially rigid with the adapter head 40 fixed (e.g., clamped) to the drive or output shaft 10 of the converter unit, assists in holding the drive arm stably in parking position.

As shown by comparison of FIGS. 1 and 5, the adapter head 40 has a pivot pin 42 coupling it to the drive arm D for movement of the drive arm and blade unit in a direction normal to the surface to be wiped. A blade-pressure-adjusting assembly T shown as a hook-like bolt 43 and nut 44 adjacent a shank portion of the drive arm acts in a direction to increase the pressure of the wiper blade unit B on the windshield when the nut 44 is turned on the threads of bolt in the proper direction to increase its pressure against the drive arm shank portion.

I claim:

1. In a windshield wiper, a wiper drive arm supported for oscillation about a fixed axis, a cam drum mounted for rotation on a fixed axis transversely of the aforesaid axis, power means connected to rotate the cam drum, the drum having a peripherally continuous cam groove, a cam follower in the groove located in a region diametrically of the cam drum approximately opposite from the said axis of oscillation, and a lever oscillatably mounted on said axis of oscillation, connected to move the drive arm and supporting the cam follower in contact with the groove.

2. The mechanism according to claim 1 wherein the cam drum is barrel shaped and the cam groove is generally of uniform depth for its entire extent.

3. The mechanism according to claim 1 wherein the lever has an endless or annular loop portion constituting a yoke loosely around the cam and the cam follower is a generally spherically shaped roller and a support therefor on the yoke such that the axis of rotation of the roller is normal to said axis of oscillation of the drive arm.

4. In a windshield wiper, an oscillatably mounted wiper drive arm, a cam follower connected to move with the drive arm, a rotary cam member having continuous peripheral cam surfaces in operating contact with the follower, the cam member being movable along its rotational axis out of and back to a normal operating position, and reversible drive means connected continuously to drive the cam member and maintain it in said normal operating axial position so long as the drive means is turning in one direction, the drive means including connecting means operating as a function of reversal of direction thereof to move the cam member axially out of its normal operating position for parking the drive arm in a beyond-normal-stroke position.

5. The mechanism according to claim 4 wherein the connecting means comprises suitably pitched mating screw threads on the drive means and cam member.

6. The mechanism according to claim 4 wherein the cam surfaces are defined by a groove in the cam member and the cam member has a recess intersecting the bottom of the groove capable of receiving the follower or a portion of it to lock the drive arm in parked position.

7. In an electrically operated windshield wiper, a drive arm supported for oscillating movement about a fixed pivotal axis, a yoke connected to the drive arm for concurrent movement therewith, a cam follower on the yoke, a rotatable drum having a peripherally extending continuous cam surface in working contact with the follower to oscillate the drive arm through a uniform angular normal wiping stroke, a supporting shaft coaxial with the drum and along which the drum is movable axially, a reversible motor connected to turn the drum, and means between the shaft and drum and arranged for automatic operation as a function of reversing the motor to move the drum from a normal working position of it on the shaft along the axis of the shaft, whereby to move the drive arm to a beyond-normal-stroke parking position.

References Cited in the file of this patent

UNITED STATES PATENTS

| | | |
|---|---|---|
| 963,638 | Packer | July 5, 1910 |
| 1,687,412 | White | Oct. 9, 1928 |
| 1,694,961 | Basler | Dec. 11, 1928 |
| 2,284,844 | Rappl | June 2, 1942 |
| 2,511,946 | Sacchini | June 2, 1950 |